March 5, 1968   H. DUPUIS   3,371,394
CARTRIDGE TYPE HOLDER
Filed Sept. 27, 1965
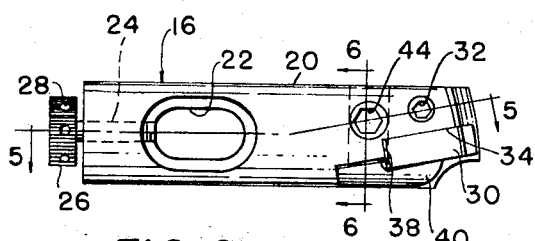
FIG. 2
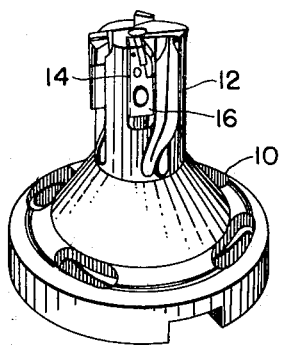
FIG. 1
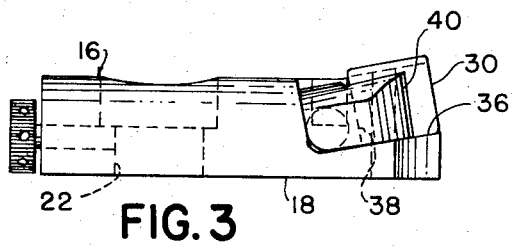
FIG. 3
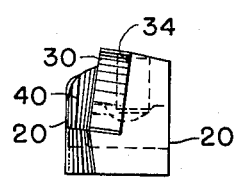
FIG. 4
FIG. 5
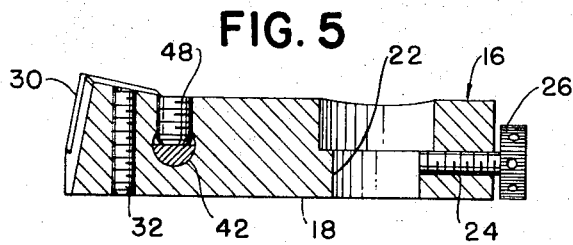
FIG. 6
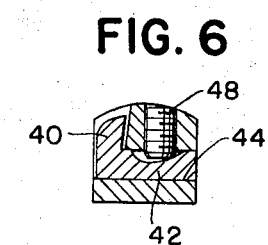
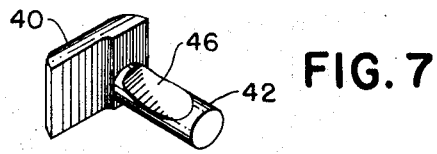
FIG. 7
*INVENTOR.*
HUBERT DUPUIS
BY *Whittemore,*
*Hulbert & Belknap*
ATTORNEYS

United States Patent Office 3,371,394
Patented Mar. 5, 1968

3,371,394
CARTRIDGE TYPE HOLDER
Hubert Dupuis, Warren, Mich., assignor to Goddard
& Goddard Company, Detroit, Mich., a corporation of Michigan
Filed Sept. 27, 1965, Ser. No. 490,594
5 Claims. (Cl. 29—96)

ABSTRACT OF THE DISCLOSURE

A cartridge for cutting inserts adapted to be inserted in a tool holder pocket without lateral extension beyond the side walls of the pocket, and to have all adjusting and clamping devices thereof operable at the exposed outer surface thereof.

---

It is an object of the present invention to provide a cartridge of the character described adapted to be secured in a pocket in a tool holder and to have means accessible while the cartridge is secured in the pocket to provide a multiplicity of adjustments of the cartridge, and to provide for replacement of a cutting insert without removing the cartridge from the pocket.

More specifically, it is an object of the present invention to provide a cartridge in the form of an elongated body adapted to be received in a correspondingly elongated pocket in a tool holder, the cartridge having means for effecting a predetermined location thereof longitudinally of the pocket and predetermined locating of a cutting insert carried by the cartridge outwardly of the pocket, and to provide for replacement of a cutting insert, in which said means are accessible for operation while the body remains secured in said pocket.

It is a feature of the present invention to provide an elongated holder adapted to be received in a pocket in a tool holder having an adjustable abutment screw at one end, said screw having an abutment head extending beyond the end of the body provided with a series of angularly spaced tool engaging portions to provide for adjustment of the screw without removal of the body from the pocket.

It is a further feature of the present invention to provide a cartridge in the form of an elongated body adapted to be received in a correspondingly elongated pocket in a tool holder, said body having at one side thereof a recess provided with a flat bottom surface engageable with one side of a cutting insert and provided with two side surfaces engageable with edges of the cutting insert, and clamping means comprising a jaw movable toward said flat bottom surface, said jaw having a lateral extension extending toward the plane occupied by said flat bottom surface, said extension having an inclined camming surface thereon, and a clamp actuating screw extending into the body from the side thereof exposed when said body is secured in said pocket, said screw having an inner end portion engageable with the inclined surface of said extension to provide for clamping and releasing of a cutting insert while said body remains secured in said pocket.

Other objects and features of the invention will become apparent as the description proceeds, especially when taken in conjunction with the accompanying drawing, illustrating a preferred embodiment of the invention, wherein:

FIGURE 1 is a perspective view of a tool holder in which a plurality of cartridges are mounted.

FIGURE 2 is an enlarged plan view of a cartridge constructed in accordance with the present invention.

FIGURE 3 is a side elevation of the cartridge shown in FIGURE 2.

FIGURE 4 is an end view of the cartridge shown in FIGURE 2, as viewed from the right.

FIGURE 5 is a section on the line 5—5, FIGURE 2, on a somewhat enlarged scale.

FIGURE 6 in a sectional view of the line 6—6, FIGURE 2.

FIGURE 7 is a perspective view of the insert clamping jaw.

Referring first to FIGURE 1 there is illustrated a tool holder 10 having a shank 12 provided with a plurality of elongated pockets 14 each having a flat bottom wall and opposed flat side walls and a closed inner end wall for the reception of the cartridges subsequently to be disclosed. Each of the pockets 14 has a threaded recess extending radially inwardly of the tool holder intermediate the ends of the bottom surface of the pocket.

The cartridges, details of which are illustrated in FIGURES 2–7, are elongated bodies each of which has a recess adjacent one end thereof adapted to receive a cutting insert such for example as a flat side polygonal carbide insert. The cutting inserts are adapted to be clamped in a cartridge and the cartridge is then clamped in properly located position in the pocket in the tool holder.

In accordance with the present invention means are provided which are accessible while the cartridge remains secured in the pocket 14 of the tool holder to vary its longitudinal location, to vary the radial location of the cutting insert, and to provide for release of a cutting insert and replacement of a new cutting insert therein.

The cartridge comprises an elongated body 16 having a flat bottom surface 18 adapted normally to rest on the flat bottom surface of the pocket 14. The cartridge is also provided with flat side surfaces 20 adapted to fit snugly between opposed flat side surfaces of the pocket 14. The cartridge is provided with an elongated countersunk through opening 22 for the reception of a clamping screw which extends through the opening and into the threaded opening in the bottom surface of the pocket 14 as previously described.

In order to provide for accurate location of the cartridge longitudinally of the recess, a locating abutment screw 24 is provided in the inner end of the cartridge, the screw having a knurled abutment head 26 provided with a multiplicity of tool engaging portions 28 herein indicated as radially extending openings. The openings may extend completely through the abutment head if desired. It will be apparent that when the cartridge is in an elongated pocket having a closed end, it may be located longitudinally in the pocket by adjustment of the screw 24 and thereafter by movement of the cartridge 16 to insure engagement between the head 26 of the screw and the closed end of the pocket.

In addition to providing for longitudinal location of the cartridge, means are provided for effecting radial adjustment of the cutting insert 30 outwardly or inwardly of the recess. This is accomplished by the provision of a radial adjustment screw 32 which extends completely through the cartridge adjacent the end thereof carrying the cutting insert 30. With the adjustment screw in the position shown in FIGURE 5, it will be observed that the screw does not extend beoynd the bottom surface 18 of the cartridge and hence the bottom surface 18 will lie flat against the bottom surface of the pocket 14. However, when the cartridge is secured in the pocket by a screw extending through the elongated opening 22, the screw 32 may be forced downwardly to provide limited upward displacement of the cartridge and hence radial outward adjustment of the cutting insert 30.

It will of course be apparent that this adjustment of the cutting insert 30 may be made while the cartridge 16 is located in the pocket 14, since the outer end of the screw 32 is accessible through the open side of the pocket 14.

Similarly, means are provided for clamping the cutting insert 30 in a recess provided adjacent one end of the cartridge body 16. The recess is provided with a flat bottom surface 34 engageable with one flat side surface of the insert 30 and flat side surfaces 36 and 38 engageable with corresponding edge surfaces of the insert 30. Accordingly, the insert 30 is accurately located with respect to the cartridge body 16 when it is in surface engagement with the surfaces 34, 36 and 38 of the recess provided adjacent one end of the cutter body.

In order to retain the cutting insert in properly located relation in the recess, clamping means are provided comprising a jaw 40 having an elongated extension 42 of generally circular cross-section received in a cylindrical opening 44 provided in the cutter body, as best seen in FIGURE 6. The extension 42 is provided with a camming surface 46 which is inclined as indicated in FIGURE 6 and is adapted to be engaged by one end of the clamping screw 48. It will be apparent from an inspection of FIGURE 6 that the clamping screw when forced downwardly cams the clamping jaw 40 to the right as seen in FIGURE 6, and this movement of the clamping jaw moves it into clamping engagement with the cutting insert as clearly illustrated in FIGURES 2–4.

It will be observed that the clamping screw 48 is adapted to be operated from the upper exposed side of the cartridge and hence a cutting insert may be released and removed and a new cutting insert inserted and clamped in position while the cartridge remains in the pocket 14.

While the means for operating the clamping jaw 40 is illustrated herein as comprising an inclined cam surface and an associated actuating screw, equivalent results may be obtained by providing an eccentric end portion on the screw 48 operable in a transverse slot provided in the extension 42.

The invention as described in the foregoing is thus characterized in that the cartridge which may be provided initially with the cutting inserts 30, may be loosely positioned in the pocket 14 and brought into required operating position by adjustment of the screw 24. After initial usage of the cutter it is found that an adjustment of the inserts 30 is ordinarily required to maintain size but that after such initial adjustment the cutter needs no further adjustment throughout the life of the cutting inserts. When a cutting insert is worn out or is damaged or broken, it may be readily released without affecting the adjustment of the cartridge body 16 by manipulation of the clamping screw 44 and a new insert located in operating position. In the event that replacement of a single insert is required due to damage, it may be required to effect radial inward positioning of the new insert by appropriate adjustment of the screw 32 for a break-in period, after which the new insert may be adjusted outwardly final operating position.

With the foregoing construction, after insertion of a plurality of cartridges in a rotatable holder, all of the cutting inserts may be brought to the exactly correct operating position by loosening the clamping screw extending through the opening 22 and effecting longitudinal adjustment of the body 16 by rotation of the screw 24 and effecting radial adjustment of the insert 30 by adjustment of the screw 32, after which the clamping screw may be tightened. Thus, by employing suitable gauge means and a rotatable holder for the cutter body 10, all of the cutting inserts may be quickly and accurately adjusted into proper position without removing the cartridges 16 from the pockets 14 of the cutter holder 10.

The drawings and the foregoing specification constitute a description of the improved cartridge type holder in such full, clear, concise and exact terms as to enable any person skilled in the art to practice the invention, the scope of which is indicated by the appended claims.

What I claim as my invention is:

1. A cartridge for cutting inserts adapted to be received in a tool holder pocket having a bottom wall provided with a tapped hole therein and opposed side walls, said cartridge having an outer surface, a bottom surface adapted to rest on the bottom wall of said pocket and having an overall width between its side surfaces less than the space between the opposed side walls of the pocket whereby said cartridge may be inserted in the pocket without projecting laterally therebeyond, said cartridge having a recess at one side thereof for receiving a replaceable cutting insert, said recess having a bottom wall on which a side of the insert is received, said clamp on said cartridge movable transversely thereof and engageable with the other side of an insert in said recess, cam means for moving said clamp comprising an actuator movably mounted in an opening provided in the said outer surface of said cartridge.

2. A cartridge as defined in claim 1, said cartridge having an elongated opening extending therethrough between its outer and bottom surfaces for receiving a screw cooperable with the tapped hole in the bottom wall of the pocket.

3. A cartridge as defined in claim 1, said cam means comprising an elongated stem on said clamp extending in a direction perpendicular to the bottom wall of said recess and having an inclined camming surface thereon, and said actuator comprising a screw having its inner end engageable with said inclined surface.

4. A cartridge for cutting inserts comprising an elongated body having bottom and top surfaces and flat opposed side surfaces extending continuously from said bottom to said top surface, a recess at one end of said cartridge opening into the end, the top and one side surface thereof, said recess having a support surface extending generally in the same direction as the side surfaces of said cartridge for engaging one flat side of a cutting insert, a clamp having a clamping head engageable with the other side of the insert and dimensioned to occupy said recess without extending beyond the adjacent side surface of said cartridge, said clamp having a stem extending transversely of said cartridge and having an inclined camming surface, and a screw extending through a threaded opening in the top surface of said cartridge into engagement with said inclined surface.

5. In combination, a tool holder having a pocket provided with a bottom wall and opposed side walls, said bottom wall having a threaded hole therein, a cartridge having opposed bottom and outer surfaces, and opposed side surfaces dimensioned to fit between the side walls of said pocket, said cartridge having a through opening extending from its outer surface through its bottom surface for receiving a screw engageable in the threaded hole in the bottom wall of said pocket, said cartridge having a recess at a corner between its outer surface and a side surface thereof for receiving a cutting insert, said recess having a flat surface extending generally in the same direction as said side surfaces for engaging one flat side of a cutting insert, a clamp having a clamping head engageable with the other side of the insert and dimensioned to occupy said recess without extending beyond the adjacent side surface of said cartridge, said clamp having a stem extending transversely of said cartridge and having an inclined camming surface, and a screw extending through a threaded opening in the top surface of said cartridge into engagement with said inclined surface.

References Cited

UNITED STATES PATENTS

| | | | |
|---|---|---|---|
| 2,825,959 | 3/1958 | Bader | 29—96 |
| 3,189,976 | 6/1965 | Pickril | 29—96 |
| 3,205,558 | 9/1956 | Stier | 29—96 |
| 3,220,089 | 11/1965 | Hammers | 29—96 |
| 3,226,797 | 1/1966 | Hertel | 29—96 |
| 3,236,125 | 2/1966 | Lundgren | 77—58 |

FOREIGN PATENTS

| | | |
|---|---|---|
| 964,725 | 7/1964 | Great Britain. |
| 630,870 | 11/1961 | Canada. |

HARRISON L. HINSON, *Primary Examiner.*